March 22, 1966  W. J. FANNING  3,242,403
WOUND CAPACITOR
Filed March 19, 1964  2 Sheets-Sheet 1
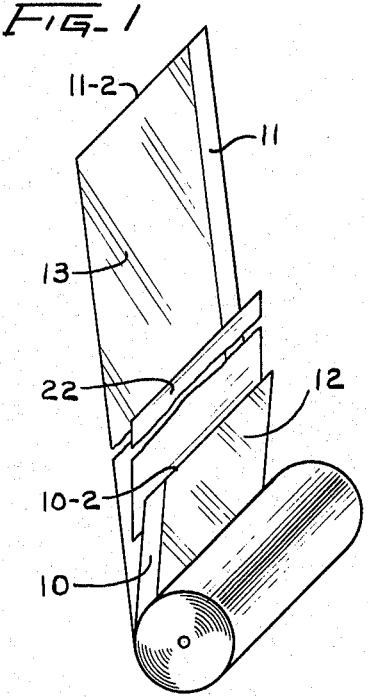
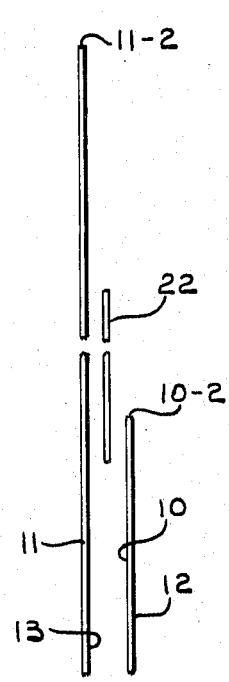
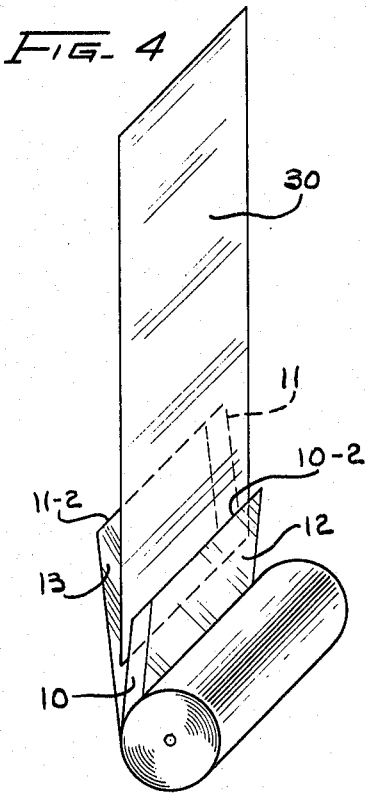
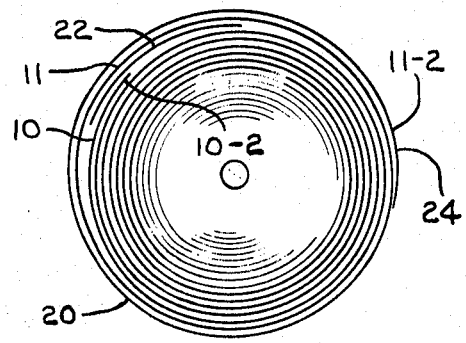
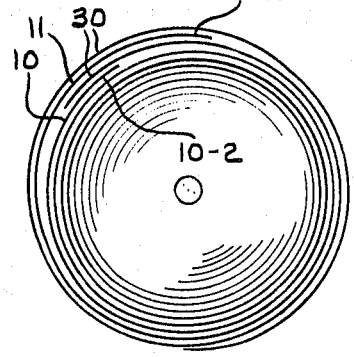
INVENTOR
W.J. FANNING
BY A.C. Schwarz, Jr.
ATTORNEY March 22, 1966  W. J. FANNING  3,242,403
WOUND CAPACITOR Filed March 19, 1964  2 Sheets-Sheet 2

3,242,403
WOUND CAPACITOR
William J. Fanning, Melrose Park, Ill., assignor to Western Electric Company, Incorporated, New York, N.Y., a corporation of New York
Filed Mar. 19, 1964, Ser. No. 353,155
4 Claims. (Cl. 317—260)

This invention relates to capacitors, and more particularly to wound metallized tape capacitors having a high degree of insulation resistance between the electrodes thereof.

In the fabrication of a wound, metallized capacitor of the type comprising a pair of dielectric tapes each having a metallized electrode on one side thereof, a high voltage is applied to the electrodes which creates an arc between the trailing end of the inner electrode and the outer electrode and effects the vaporizing of a portion of both to clear the capacitor This arcing apparently weakens the capacitor since many of such capacitors tend to fail in the region of the arcing when subjected to accelerated life testing conditions.

An object of the present invention is to provide a capacitor of improved quality.

A further object of the invention is to provide a metallized tape capacitor in which the trailing end portions of the electrodes are provided with increased electrical insulation therebetween.

A capacitor illustrating certain features of the invention may include two dielectric tapes which are each metallized on one side to form electrodes and which are wound into a roll with the leading end of the inner tape extending beyond the leading end of the outer tape and with the trailing end of the outer tape extending beyond the trailing end of the inner tape. A dielectric strip is interposed between the trailing end of the inner tape and the trailing end of the outer tape and projects beyond the trailing end of the inner tape to provide an extra layer of insulation between the end portion of the inner electrode and the outer electrode.

In another embodiment of the invention, a dielectric strip is placed between the trailing end portions of the two metallized tapes and extends beyond the ends thereof and is wound around the capacitor to provide an extra layer of insulation between the trailing end portions of the electrodes and to provide a protective covering for the capacitor.

Other objects, advantages and novel aspects of the invention will become apparent upon consideration of the following detailed description, in conjunction with the accompanying drawings, in which:

FIG. 1 is a perspective view of a partially wound capacitor showing the trailing end portions of the pair of metallized dielectric tapes thereof in separated relation to each other and a strip of dielectric interposed therebetween;

FIG. 2 is an enlarged fragmentary diagrammatic view of the pair of metallized dielectric tapes with the leading end portions thereof engaged by a split arbor and showing the strip of dielectric placed between the trailing end portion of the inner tape and the outer tape;

FIG. 3 is an enlarged diagrammatic end view of the wound capacitor;

FIG. 4 is a perspective view showing a partially wound modified form of capacitor with the trailing end portions of the pair of metallized dielectric tapes in spaced relation to each other and a longer strip of dielectric partially interposed between the trailing end portions of the pair of tapes prior to the winding of the strip around the capacitor;

FIG. 5 is an enlarged diagrammatic end view of the capacitor shown in FIG. 4.

Figure 6:
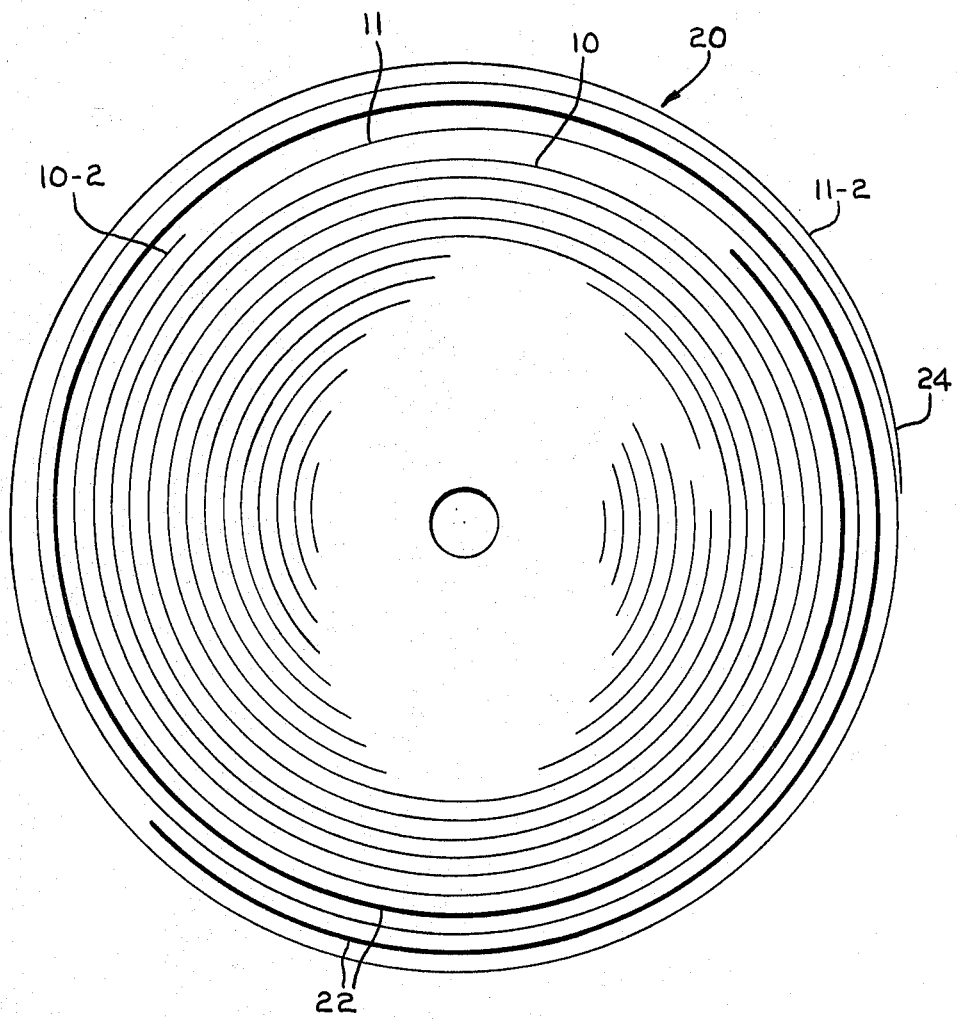
FIG. 6 is an enlarged diagrammatic end view of the capacitor shown in FIG. 1 with the dielectric strip insert extending through at least one convolution.

Referring to FIGS. 1 to 3 of the drawings, one embodiment of the present invention includes a pair of dielectric tapes 10 and 11, each being metallized on one side thereof to form electrodes 12 and 13 which are slightly less in width than the width of the tapes and extend from opposite edges thereof as indicated in FIG. 1. The leading end portions of the tapes 10 and 11 extend from supply rolls thereof (not shown) and are gripped between a pair of arbor sections of a split arbor 16 with the leading end 10–1 of the tape 10 extending beyond the leading end 11–1 of the tape 11 as indicated in FIG. 2. An arbor of the type disclosed in the co-pending application of W. J. Fanning, Serial No. 369,826, filed May 25, 1964, may be used for winding the tapes 10 and 11 thereon. The arbor is rotated in a direction indicated by the arrow 18 so that the tape 10 is the inner one and the tape 11 the outer one of the pair of tapes with respect to the wound capacitor 20, and the electrodes 12 and 13 are each disposed on the inside faces of the tapes 10 and 11, respectively, and in spaced and insulated relation to each other in the wound capacitor.

After a predetermined length of the tapes 10 and 11 have been wound onto the arbor, the arbor is stopped and the tape 10 is severed from the supply thereof. A dielectric strip 22 is then inserted between the trailing end portion 10–2 of the inner tape and the outer tape 11. The dielectric strip is coextensive in width with the superposed tapes 10 and 11 and is positioned relative to the tapes so as to overlie the trailing end portion 10–2 of the inner tape 10 and extend a substantial distance therebeyond. Preferably, the dielectric strip 22 extends through at least one complete convolution of the capacitor to serve as a thermal barrier to prevent heat damage to the underlying layers during the sealing of the outer tape to the capacitor (FIG. 6).

The outer tape 11 is severed at a point a predetermined distance beyond the end of the inner tape 10 to provide a trailing end portion 11–2 which overlies the dielectric strip 22 and is wound one or more turns around the capacitor and sealed or otherwise secured thereto at 24. As indicated in the drawings, the dielectric strip 22 provides an extra layer of insulation between the trailing end of the inner electrode 12 and the outer electrode 13.

A second embodiment of the invention as disclosed in FIG. 4 includes the capacitor-forming metallized dielectric tapes 10 and 11 which are wound in the same manner as described hereinabove with the trailing end 11–2 of the outer tape 11 extending beyond the trailing end 10–2 of the inner tape 10. One end of a dielectric strip 30 of a width coextensive with that of the tapes 10 and 11 is inserted between the trailing end portions of the tapes 10–2 and 11–2 to overlie a portion of the inner tape 10 as shown in FIGS. 4 and 5. The dielectric strip 30 provides a layer of insulation between the trailing end of the electrode 12 and the electrode 13 and extends beyond the trailing ends of both tapes and is wound around the tapes through at least one convolution and sealed thereto. In this embodiment, the dielectric strip serves to provide an additional layer of insulation between the trailing end of the inner electrode 12 and the outer electrode 13 and also to form a protective dielectric band around the capacitor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A capacitor comprising:
   a pair of dielectric tapes disposed in superposed convolutely arranged layers and with each tape having a metallized electrode on one face thereof and with said electrodes disposed in spaced and insulated relation to each other and with a trailing end of one of the tapes extending beyond the trailing end of the other tape and with said one face of said one tape and the electrode thereon directed toward and engaging the other face of the other tape; and
   a dielectric strip interposed between only a portion of the two tapes longitudinally thereof and in engagement with the electrode on said one tape and with a first longitudinal portion of the strip overlying a portion of the trailing end of said other tape and in engagement with the other face thereof and with a second longitudinal portion of the strip extending longitudinally beyond said other tape, said dielectric strip extending through at least one convolution to serve as a thermal barrier to prevent heat damage to the underlying layers during the sealing of the outer layer to the capacitor.

2. A capacitor as defined in claim 1 wherein:
   the trailing end of said one tape overlies and extends beyond the trailing end of said dielectric strip.

3. A capacitor as defined in claim 1 wherein:
   said dielectric strip extends beyond the trailing end of said one tape and forms a protective layer around the capacitor.

4. A capacitor comprising:
   a pair of dielectric tapes disposed in superposed, convolutely arranged layers and with each tape having a metallized electrode on one face thereof and with said electrodes in spaced and insulated relation to each other; and
   a dielectric strip interposed between only a portion of the two tapes longitudinally thereof and with a portion of the strip extending longitudinally beyond the trailing end of at least one of said tapes, said dielectric strip extending through at least one convolution to serve as a thermal barrier to prevent heat damage to the layers underlying said strip during the sealing of the outer layer to the capacitor.

References Cited by the Examiner

UNITED STATES PATENTS

| | | | |
|---|---|---|---|
| 2,388,139 | 10/1945 | Grouse | 317—260 X |
| 2,492,166 | 12/1949 | Marco | 317—260 |
| 3,058,040 | 10/1962 | Wellington | 317—260 X |

FOREIGN PATENTS 717,446  2/1942  Germany.

ROBERT K. SCHAEFER, *Acting Primary Examiner.*

JOHN F. BURNS, *Examiner.*